(12) United States Patent
Strutt

(10) Patent No.: US 12,163,472 B2
(45) Date of Patent: Dec. 10, 2024

(54) ENGINE EXHAUST NOZZLE WITH ACOUSTIC ATTENUATION

(71) Applicant: Rohr, Inc., Chula Vista, CA (US)

(72) Inventor: Andrew J. Strutt, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/902,316

(22) Filed: Sep. 2, 2022

(65) Prior Publication Data

US 2024/0077029 A1 Mar. 7, 2024

(51) Int. Cl.
| | |
|---|---|
| *F02K 1/82* | (2006.01) |
| *F01D 25/30* | (2006.01) |
| *F02C 7/24* | (2006.01) |
| *B64D 33/02* | (2006.01) |

(52) U.S. Cl.
CPC .............. *F02C 7/24* (2013.01); *F01D 25/30* (2013.01); *F02K 1/827* (2013.01); *B64D 2033/0206* (2013.01); *F05D 2260/96* (2013.01)

(58) Field of Classification Search
CPC ... B64D 33/06; F02C 7/24; F02K 1/44; F02K 1/827
See application file for complete search history.

(56) References Cited

U.S. PATENT DOCUMENTS

| | | | | |
|---|---|---|---|---|
| 2,909,235 A | * | 10/1959 | Beranek | F01N 1/10 |
| | | | | 181/252 |
| 2,988,302 A | * | 6/1961 | Smith | F02K 1/36 |
| | | | | 244/209 |
| 3,041,836 A | * | 7/1962 | Truman | F02K 1/822 |
| | | | | 60/725 |
| 3,437,173 A | * | 4/1969 | Ehrich | C10M 3/00 |
| | | | | 181/213 |
| 3,542,152 A | | 11/1970 | Adamson | |

(Continued)

FOREIGN PATENT DOCUMENTS

| | | |
|---|---|---|
| CN | 104175616 B | 6/2016 |
| CN | 104723616 B | 7/2016 |

(Continued)

OTHER PUBLICATIONS

Annotated figure of turbofan engine and explanatory text [online]. L'avionnaire (The Aircraft Manufacturer) website, 2021 [retrieved on Jul. 6, 2023]. Retrieved from the internet :<https://web.archive.org/web/20210829130703/https://www.lavionnaire.fr/AngTurbojet.php>. (Year: 2021).*

(Continued)

*Primary Examiner* — Todd E Manahan
*Assistant Examiner* — Marc Amar
(74) *Attorney, Agent, or Firm* — Getz Balich LLC

(57) ABSTRACT

An assembly is provided for a gas turbine engine. This engine assembly includes an exhaust nozzle extending circumferentially about an axial centerline. The exhaust nozzle extends axially along the axial centerline to a trailing edge. The exhaust nozzle extends radially between an exterior inner surface and an exterior outer surface. The exhaust nozzle includes an inner skin, an outer skin and an internal cavity. The inner skin forms the exterior inner surface and includes a plurality of perforations. The internal cavity is disposed radially between the inner skin and the outer skin. The internal cavity is fluidly coupled with the perforations.

12 Claims, 5 Drawing Sheets

(56) References Cited

U.S. PATENT DOCUMENTS

| | | | |
|---|---|---|---|
| 4,044,555 A * | 8/1977 | McLoughlin | F02K 1/825 60/264 |
| 4,137,992 A * | 2/1979 | Herman | F02K 1/827 181/269 |
| 4,240,519 A | 12/1980 | Wynosky | |
| 4,244,441 A * | 1/1981 | Tolman | F01D 25/30 60/262 |
| 4,944,362 A * | 7/1990 | Motsinger | F02K 1/827 181/292 |
| 5,655,361 A | 8/1997 | Kishi | |
| 6,041,590 A * | 3/2000 | Hayton | F02K 1/822 60/766 |
| 6,274,216 B1 | 8/2001 | Gonidec | |
| 6,536,556 B2 | 3/2003 | Porte | |
| 6,845,607 B2 | 1/2005 | Lair | |
| 6,935,834 B2 | 8/2005 | Lata Perez | |
| 7,051,489 B1 | 5/2006 | Swiszcz | |
| 7,784,283 B2 | 8/2010 | Yu | |
| 8,043,690 B2 | 10/2011 | Hand | |
| 8,302,733 B2 | 11/2012 | Peiffer | |
| 8,727,072 B2 | 5/2014 | Ayle | |
| 8,955,643 B2 | 2/2015 | Liu | |
| 9,051,899 B2 | 6/2015 | Malot | |
| 9,062,610 B2 | 6/2015 | Morvant | |
| 9,200,537 B2 | 12/2015 | Bouchard | |
| 9,261,008 B2 | 2/2016 | Mecuson | |
| 9,403,338 B2 | 8/2016 | Tuczek | |
| 9,469,985 B1 | 10/2016 | Ichihashi | |
| 9,592,918 B2 | 3/2017 | Yu | |
| 9,708,930 B2 | 7/2017 | Koroly | |
| 9,732,677 B1 | 8/2017 | Chien | |
| 9,764,818 B2 | 9/2017 | Nampy | |
| 9,771,868 B2 | 9/2017 | Nesbitt | |
| 9,869,186 B2 | 1/2018 | Xu | |
| 10,060,269 B2 | 8/2018 | Smith | |
| 10,332,501 B2 | 6/2019 | Lin | |
| 10,695,986 B2 | 6/2020 | Gurney | |
| 11,136,942 B2 | 10/2021 | Lopez | |
| 11,428,191 B1 | 8/2022 | Alonso-Miralles | |
| 2007/0034447 A1 | 2/2007 | Proscia | |
| 2007/0119150 A1* | 5/2007 | Wood | F02C 7/042 60/226.1 |
| 2007/0256889 A1* | 11/2007 | Yu | F02K 1/04 181/214 |
| 2008/0020176 A1 | 1/2008 | Ayle | |
| 2008/0020188 A1 | 1/2008 | Gale | |
| 2013/0227952 A1* | 9/2013 | Grip | F02K 1/04 181/214 |
| 2013/0306403 A1 | 11/2013 | Todorovic | |
| 2014/0349082 A1 | 11/2014 | Tien | |
| 2015/0159515 A1* | 6/2015 | Chiou | B64D 29/06 415/182.1 |
| 2015/0367953 A1 | 12/2015 | Yu | |
| 2016/0169005 A1 | 6/2016 | Quach | |
| 2016/0368615 A1* | 12/2016 | Alonso-Miralles | B64D 33/06 |
| 2017/0028667 A1 | 2/2017 | Fach | |
| 2017/0175539 A1 | 6/2017 | Hagan | |
| 2017/0182723 A1 | 6/2017 | Calisch | |
| 2017/0211393 A1 | 7/2017 | Wong | |
| 2017/0225764 A1 | 8/2017 | Nampy | |
| 2017/0301334 A1 | 10/2017 | Nampy | |
| 2017/0328221 A1 | 11/2017 | Allen | |
| 2018/0051575 A1 | 2/2018 | Weber | |
| 2018/0142621 A1 | 5/2018 | Biset | |
| 2018/0142622 A1 | 5/2018 | Biset | |
| 2019/0270504 A1 | 9/2019 | Cedar | |
| 2020/0003230 A1 | 1/2020 | Alonso-Miralles | |
| 2020/0063691 A1 | 2/2020 | Kruckenberg | |
| 2020/0072161 A1* | 3/2020 | Bouchet | G10K 11/172 |
| 2020/0088135 A1 | 3/2020 | Lopez | |
| 2020/0103139 A1 | 4/2020 | Schiller | |
| 2020/0141357 A1 | 5/2020 | Murray | |
| 2020/0291891 A1* | 9/2020 | Aten | F02K 1/38 |
| 2020/0309028 A1 | 10/2020 | Murugappan | |
| 2021/0049993 A1 | 2/2021 | Cazeaux | |

FOREIGN PATENT DOCUMENTS

| | | |
|---|---|---|
| DE | 1000188 B * | 1/1957 |
| EP | 3267023 B1 | 5/2020 |
| GB | 1406844 A | 9/1975 |
| GB | 2550926 B | 7/2018 |
| JP | 5151535 | 2/2013 |
| WO | 2014200499 B1 | 12/2014 |
| WO | 2022117968 A1 | 6/2022 |

OTHER PUBLICATIONS

EP Search Report for EP Patent Application No. 23195108.8 dated Jan. 30, 2024.

* cited by examiner

ENGINE EXHAUST NOZZLE WITH ACOUSTIC ATTENUATION

BACKGROUND

1. Technical Field

This disclosure relates generally to an aircraft propulsion system and, more particularly, to sound attenuation for the aircraft propulsion system.

2. Background Information

An aircraft propulsion system directs combustion products through an exhaust outlet between an exhaust nozzle and an exhaust center body. Sound waves (e.g., noise) generated during propulsion system operation may travel with the combustion products out through the exhaust outlet. Some exhaust center bodies are configured with structures for attenuating these sound waves. While known sound attenuating structures have various advantages, there is still room in the art for improvement. In particular, there is a need in the art for sound attenuation structures capable of attenuating low frequency sound waves while maintaining structural integrity.

SUMMARY OF THE DISCLOSURE

According to an aspect of the present disclosure, an assembly is provided for a gas turbine engine. This engine assembly includes an exhaust nozzle extending circumferentially about an axial centerline. The exhaust nozzle extends axially along the axial centerline to a trailing edge. The exhaust nozzle extends radially between an exterior inner surface and an exterior outer surface. The exhaust nozzle includes an inner skin, an outer skin and an internal cavity. The inner skin forms the exterior inner surface and includes a plurality of perforations. The internal cavity is disposed radially between the inner skin and the outer skin. The internal cavity is fluidly coupled with the perforations.

According to another aspect of the present disclosure, another assembly is provided for a gas turbine engine. This engine assembly includes an exhaust nozzle extending circumferentially about an axial centerline. The exhaust nozzle extends axially along the axial centerline to a trailing edge. The exhaust nozzle extends radially between an inner surface and an outer surface. The exhaust nozzle includes a plurality of resonance chambers and a plurality of perforations in the exterior inner surface. Each of the resonance chambers is fluidly coupled with a respective set of the perforations. A first of the resonance chambers extends circumferentially within the exhaust nozzle at least thirty degrees about the axial centerline.

According to still another aspect of the present disclosure, another assembly is provided for a gas turbine engine. This engine assembly includes an exhaust nozzle extending circumferentially about an axial centerline. The exhaust nozzle extends axially along the axial centerline to a trailing edge. The exhaust nozzle extends radially between an inner surface and an outer surface. The exhaust nozzle includes a plurality of resonance chambers and a plurality of perforations in the exterior inner surface. Each of the resonance chambers is fluidly coupled with a respective set of the perforations. The exhaust nozzle has an axial nozzle length. A first of the resonance chambers has an axial chamber length that is greater than or equal to one-fifth of the axial nozzle length.

The resonance chambers may be arranged circumferentially about the axial centerline.

The exhaust nozzle may also include a forward bulkhead. Each of the resonance chambers may extend axially within the exhaust nozzle to the annular forward bulkhead.

The outer skin may form the exterior outer surface.

The outer skin may be non-perforated along the internal cavity.

The exhaust nozzle may also include a first bulkhead extending radially between the inner skin and the outer skin. The internal cavity may extend axially within the exhaust nozzle to the first bulkhead.

The exhaust nozzle may also include a second bulkhead extending radially between the inner skin and the outer skin. The internal cavity may extend axially within the exhaust nozzle between the first bulkhead and the second bulkhead.

The exhaust nozzle may also include a plurality of baffles. Each of the baffles may extend radially between the inner skin and the outer skin. Each of the baffles may extend axially between the first bulkhead and the second bulkhead. The baffles may include a first baffle and a second baffle. The internal cavity may extend circumferentially within the exhaust nozzle between the first baffle and the second baffle.

The inner skin may be connected to the outer skin at an intersection at the trailing edge. The internal cavity may extend axially within the exhaust nozzle between the first bulkhead and the intersection.

The exhaust nozzle may also include a plurality of baffles. Each of the baffles may extend radially between the inner skin and the outer skin. Each of the baffles may extend axially between the first bulkhead and the intersection. The baffles may include a first baffle and a second baffle. The internal cavity may extend circumferentially within the exhaust nozzle between the first baffle and the second baffle.

The exhaust nozzle may have an axial nozzle length. The internal cavity may have an axial cavity length that is greater than or equal to one-fifth of the axial nozzle length.

The exhaust nozzle may have an axial nozzle length. The internal cavity may have an axial cavity length that is greater than or equal to one-half of the axial nozzle length.

The internal cavity may extend circumferentially within the exhaust nozzle at least thirty degrees about the axial centerline.

The internal cavity may extend circumferentially within the exhaust nozzle at least sixty degrees about the axial centerline.

The outer skin may converge to the inner skin as the exhaust nozzle extends towards the trailing edge.

The assembly may also include an exhaust center body. The exhaust nozzle may be spaced radially outboard from and may extend circumferentially about the exhaust center body.

The inner skin may form a portion of an outer peripheral boundary of a core flowpath of the gas turbine engine.

The assembly may also include an engine core that includes a compressor section, a combustor section and a turbine section. The core flowpath may extend sequentially through the compressor section, the combustor section and the turbine section to the exhaust nozzle.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
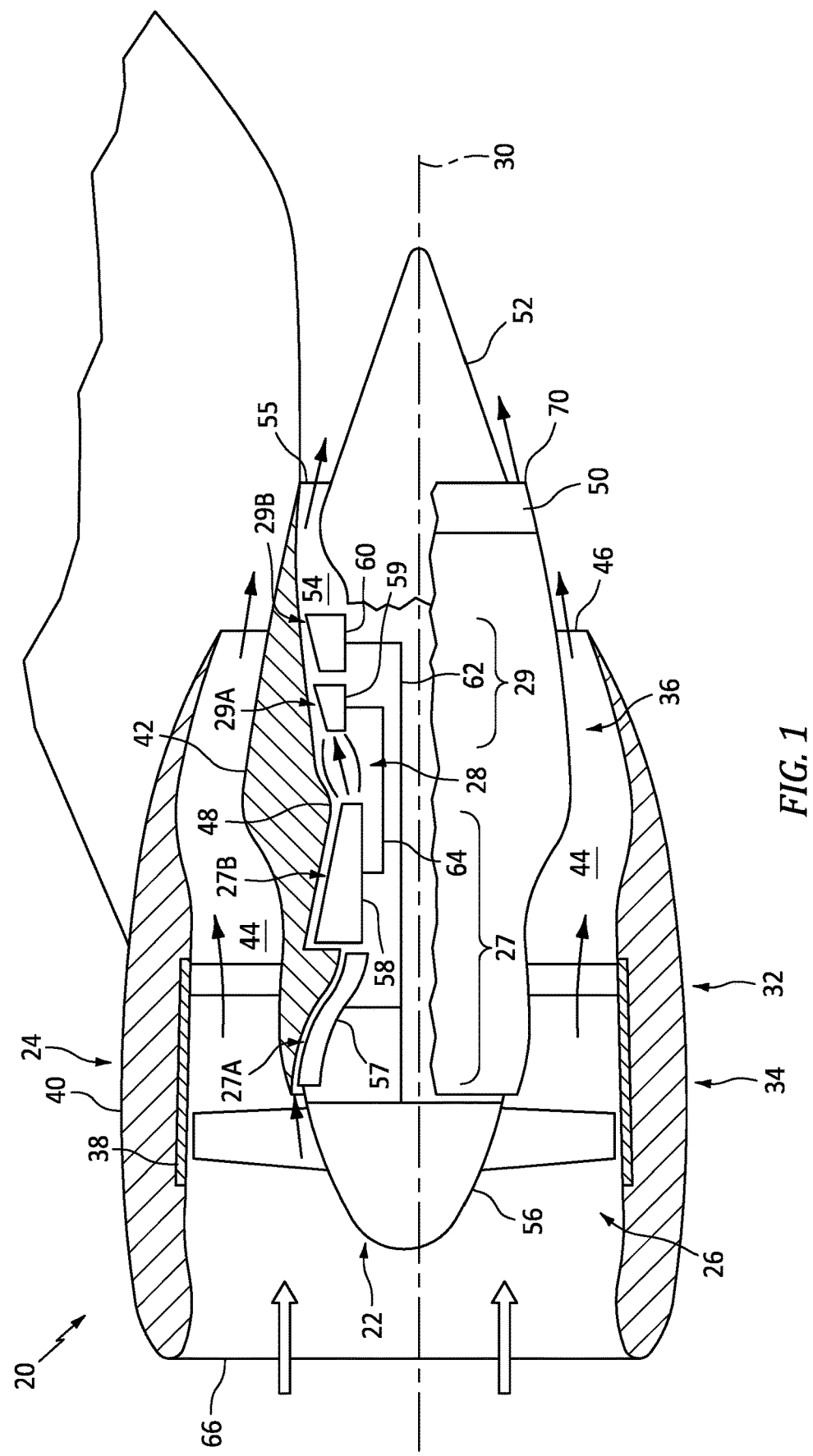
FIG. 1 is a side cutaway illustration of an aircraft propulsion system.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29B are arranged sequentially along an axial centerline 30 (e.g., a rotational axis) of the gas turbine engine 22 within an aircraft propulsion system housing 32. This housing 32 includes an outer housing structure 34 and an inner housing structure 36.

The outer housing structure 34 includes an outer case 38 (e.g., a fan case, a containment case, etc.) and an outer structure 40 of the nacelle 24; i.e., an outer nacelle structure. The outer case 38 houses at least the fan section 26. The outer nacelle structure 40 houses and provides an aerodynamic cover the outer case 38. The outer nacelle structure 40 also covers a portion of an inner structure 42 of the nacelle 24; e.g., an inner nacelle structure, which may also be referred to as an inner fixed structure. More particularly, the outer nacelle structure 40 axially overlaps and extends circumferentially about (e.g., completely around) the inner nacelle structure 42. The outer nacelle structure 40 and the inner nacelle structure 42 thereby at least partially or completely form a bypass flowpath 44. This bypass flow path 44 extends axially along the axial centerline 30 within the aircraft propulsion system 20 to a bypass exhaust 46, where the bypass flowpath 44 is radially between the nacelle structures 34 and 36.

The inner housing structure 36 includes an inner case 48 (e.g., a core case) and the inner nacelle structure 42. The inner case 48 houses one or more of the engine sections 27A-29B, where at least (or only) the engine sections 27A-29B may collectively form a core of the gas turbine engine 22. The inner nacelle structure 42 houses and provides an aerodynamic cover for the inner case 48. A downstream/aft portion of the inner housing structure 36 such as, for example, a (e.g., tubular) core exhaust nozzle 50 of the inner nacelle structure 42 also covers at least a portion of an (e.g., conical) exhaust center body 52. More particularly, the inner nacelle structure 42 and its exhaust nozzle 50 axially overlap and extend circumferentially about (e.g., completely around) the exhaust center body 52. The exhaust nozzle 50 and the exhaust center body 52 thereby collectively form a downstream/aft portion of a core flowpath 54. This core flowpath 54 extends axially within the aircraft propulsion system 20, sequentially through the engine sections 27A-29B (e.g., the engine core), to a core exhaust 55 at a downstream/aft end of the aircraft propulsion system 20.

Each of the engine sections 26, 27A, 27B, 29A and 29B of FIG. 1 includes a respective bladed rotor 56-60. Each of these engine rotors 56-60 includes a plurality of rotor blades arranged circumferentially around and connected to one or more respective rotor disks.

The fan rotor 56 and the LPC rotor 57 are connected to and driven by the LPT rotor 60 through a low speed shaft 62. The HPC rotor 58 is connected to and driven by the HPT rotor 59 through a high speed shaft 64. The engine shafts 62 and 64 are rotatably supported by a plurality of bearings (not shown). Each of these bearings is connected to the aircraft propulsion system housing 32 by at least one stationary structure such as, for example, an annular support strut.

During operation, air enters the aircraft propulsion system 20 through an airflow inlet 66. This air is directed through the fan section 26 and into the core flowpath 54 and the bypass flowpath 44. The air entering the core flowpath 54 may be referred to as core air. The air within the bypass flowpath 44 may be referred to as bypass air.

The core air is compressed by the compressor rotors 57 and 58 and directed into a combustion chamber of a combustor in the combustor section 28. Fuel is injected into the combustion chamber and mixed with the compressed core air to provide a fuel-air mixture. This fuel air mixture is ignited and combustion products thereof flow through and sequentially cause the turbine rotors 59 and 60 to rotate. The rotation of the turbine rotors 59 and 60 respectively drive rotation of the compressor rotors 58 and 57 and, thus, compression of the air received from a core airflow inlet. The rotation of the turbine rotor 60 also drives rotation of the fan rotor 56, which propels bypass air through and out of the bypass flowpath 44. The propulsion of the bypass air may account for a majority of thrust generated by the gas turbine engine 22, e.g., more than seventy-five percent (75%) of engine thrust. The aircraft propulsion system 20 of the present disclosure, however, is not limited to the foregoing exemplary thrust ratio. Furthermore, the aircraft propulsion system 20 of the present disclosure is not limited to the exemplary gas turbine engine configuration described above as discussed below in further detail.

Figure 2:
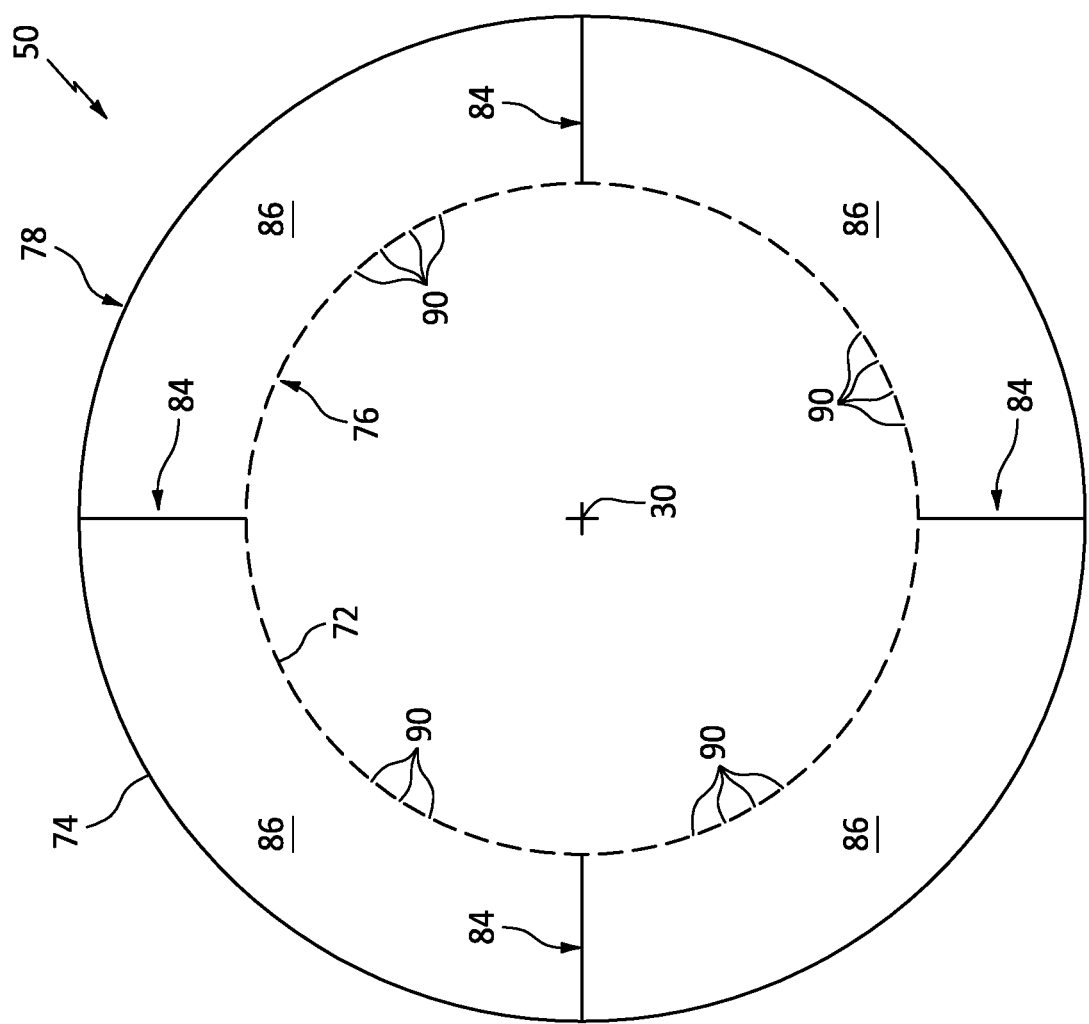
FIG. 2 is a cross-sectional illustration of an exhaust nozzle.
Figure 3:
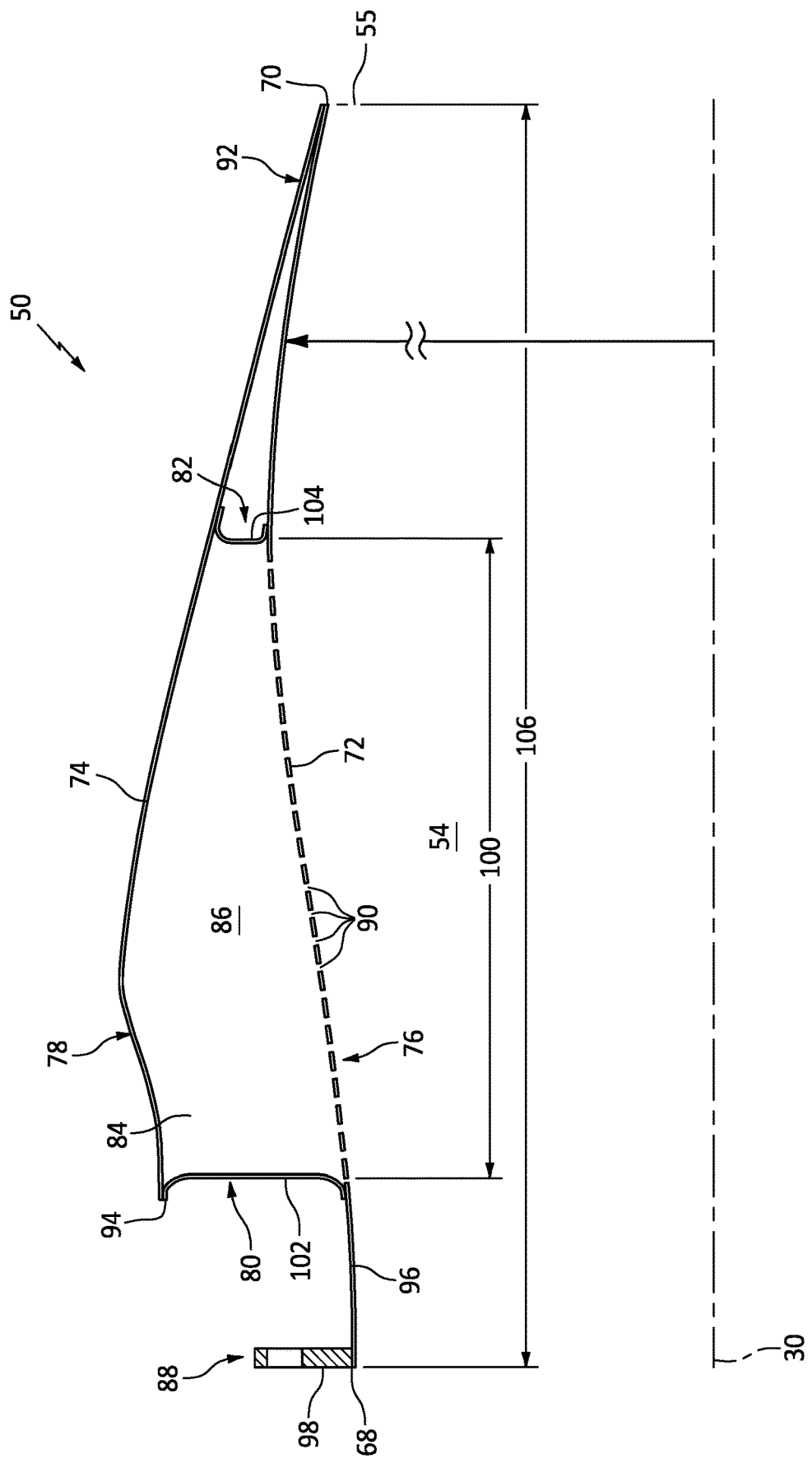
FIG. 3 is a partial side sectional illustration of the exhaust nozzle.

Referring to FIG. 2, the exhaust nozzle 50 extends circumferentially about (e.g., completely around) the axial centerline 30, which may provide the exhaust nozzle 50 with a full-hoop, tubular body. Referring to FIG. 3, the exhaust nozzle 50 extends axially along the axial centerline 30 between and to a forward, upstream end 68 of the exhaust nozzle 50 and an aft, downstream trailing edge 70 of the exhaust nozzle 50. The exhaust nozzle 50 extends radially between and to an exterior (e.g., exposed), radial inner surface 72 of the exhaust nozzle 50 and an exterior (e.g., exposed), radial outer surface 74 of the exhaust nozzle 50. The nozzle inner surface 72 of FIG. 3 forms a radial outer peripheral boundary of the core flowpath 54 within/axially through the exhaust nozzle 50. The nozzle outer surface 74 of FIG. 3 forms a radial inner peripheral boundary for the bypass air directed out of the bypass flowpath 44 of FIG. 1 through the bypass exhaust 46.

The exhaust nozzle 50 of FIGS. 2 and 3 includes a fluid permeable (e.g., perforated) radial inner skin 76, a fluid impermeable (e.g., non-perforated) radial outer skin 78, one or more fluid impermeable internal bulkheads 80 and 82, one or more fluid impermeable internal baffles 84 and one or more internal cavities 86; e.g., acoustic resonance chambers, deep acoustic cavities, etc. The exhaust nozzle 50 of FIG. 3 also includes a mounting structure 88.

Figure 4:
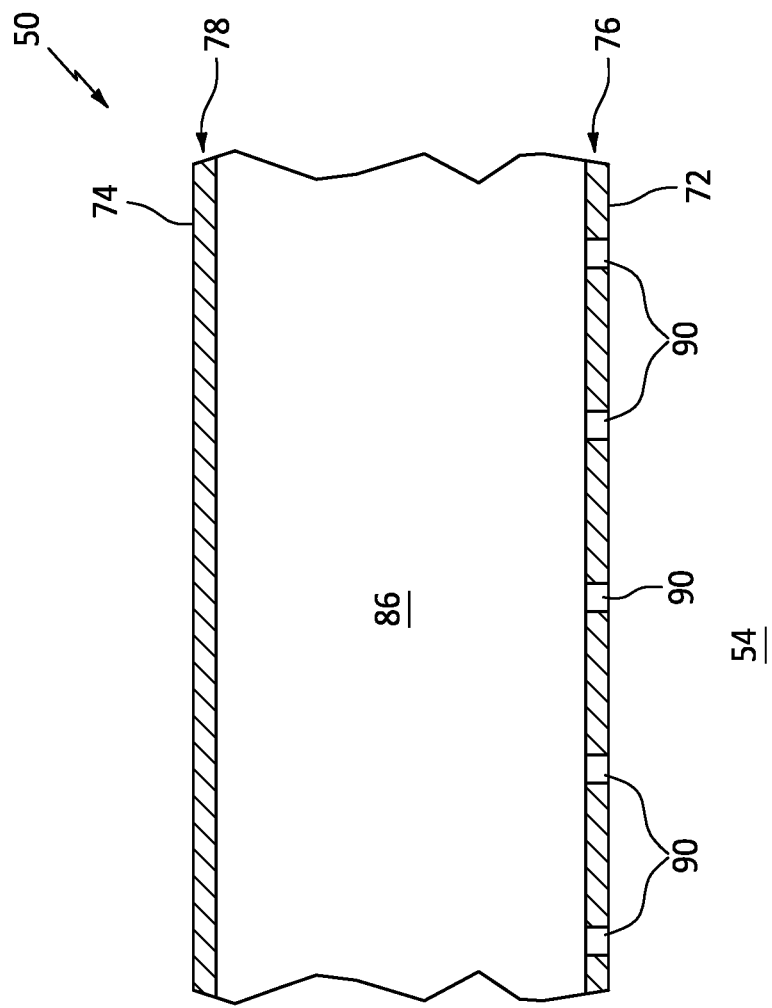
FIG. 4 is a sectional illustration of a portion of the exhaust nozzle.

The nozzle inner skin 76 may be formed from a relatively thin sheet or layer of material; e.g., sheet metal. The nozzle inner skin 76 of FIG. 3 extends axially along the axial centerline 30 between and to (or about) the nozzle upstream end 68 and the nozzle trailing edge 70. The nozzle inner skin 76 of FIG. 2 extends circumferentially about (e.g., completely around) the axial centerline 30. The nozzle inner skin 76 of FIGS. 2 and 3 may form at least a portion or an entirety of the nozzle inner surface 72, axially along and/or circumferentially about the axial centerline 30. Referring to FIG. 4, the nozzle inner skin 76 includes a plurality of inner skin perforations 90; e.g., apertures such as through-holes. Each of these inner skin perforations 90 is disposed in the nozzle inner surface 72 and extends through the nozzle inner skin 76.

The nozzle outer skin 78 of FIGS. 2 and 3 may be formed from a relatively thin sheet or layer of material; e.g., sheet metal. The nozzle outer skin 78 of FIG. 3 extends axially along the axial centerline 30 between and to (or about) the nozzle upstream end 68 and the nozzle trailing edge 70. The nozzle outer skin 78 of FIG. 2 extends circumferentially about (e.g., completely around) the axial centerline 30, and may thereby circumscribe the nozzle inner skin 76. The nozzle outer skin 78 of FIGS. 2 and 3 may form at least a portion or an entirety of the nozzle outer surface 74, axially along and/or circumferentially about the axial centerline 30. The nozzle outer skin 78 of FIGS. 2 and 3 is configured as a continuous, uninterrupted and/or non-perforated skin; e.g., a skin without any perforations at least along the nozzle cavities 86.

The nozzle outer skin 78 is generally spaced radially outboard of the nozzle inner skin 76. The nozzle outer skin 78, however, may converge radially towards (e.g., to) the nozzle inner skin 76 as the exhaust nozzle 50 extends axially towards (e.g., to) the nozzle trailing edge 70. The nozzle outer skin 78 of FIG. 3, for example, may meet and may be connected (e.g., bonded and/or mechanically fastened) to the nozzle inner skin 76 at a nozzle skin intersection 92. This intersection 92 between the nozzle outer skin 78 and the nozzle inner skin 76 may be located at (e.g., on, adjacent or proximate) the nozzle trailing edge 70. With this arrangement, a sidewall of the exhaust nozzle 50 may radially taper (e.g., a radial thickness of the exhaust nozzle 50 between the nozzle inner skin 76 and the nozzle outer skin 78 may decrease) as the exhaust nozzle 50 extends axially towards (e.g., to) the nozzle trailing edge 70.

The forward bulkhead 80 of FIG. 3 is located axially at or about the nozzle upstream end 68; e.g., at a forward, upstream end 94 of the nozzle outer skin 78. The forward bulkhead 80 is disposed radially between and may be connected to the nozzle inner skin 76 and the nozzle outer skin 78. The forward bulkhead 80 of FIG. 3, for example, extends radially between and to the nozzle inner skin 76 and the nozzle outer skin 78. The forward bulkhead 80 extends circumferentially about (e.g., completely around) the axial centerline 30, which may provide the forward bulkhead 80 with a full-hoop, annular body.

The aft bulkhead 82 of FIG. 3 is located axially between the forward bulkhead 80 and the nozzle trailing edge 70. The aft bulkhead 82 of FIG. 3, for example, is positioned axially closer to the nozzle trailing edge 70 than the forward bulkhead 80; e.g., near the nozzle skin intersection 92. The aft bulkhead 82 is disposed radially between and may be connected (e.g., bonded and/or mechanically fastened) to the nozzle inner skin 76 and the nozzle outer skin 78. The aft bulkhead 82 of FIG. 3, for example, extends radially between and to the nozzle inner skin 76 and the nozzle outer skin 78. The aft bulkhead 82 extends circumferentially about (e.g., completely around) the axial centerline 30, which may provide the aft bulkhead 82 with a full-hoop, annular body.

Referring to FIG. 2, the nozzle baffles 84 are arranged circumferentially about the axial centerline 30 in an array. Each of the nozzle baffles 84 is disposed radially between and may be connected (e.g., bonded and/or mechanically fastened) to the nozzle inner skin 76 and the nozzle outer skin 78. Each of the nozzle baffles 84 of FIG. 2, for example, extends radially between and to the nozzle inner skin 76 and the nozzle outer skin 78. Referring to FIG. 3, each of the nozzle baffles 84 is disposed axially between and may be connected (e.g., bonded and/or mechanically fastened) to the forward bulkhead 80 and the aft bulkhead 82. Each of the nozzle baffles 84 of FIG. 3, for example, extends axially between and to the forward bulkhead 80 and the aft bulkhead 82. With this arrangement, the nozzle baffles 84 divide an annular interior volume within the exhaust nozzle 50 axially between the forward bulkhead 80 and the aft bulkhead 82 to provide the nozzle cavities 86.

Referring to FIG. 2, the nozzle cavities 86 are arranged circumferentially about the axial centerline 30 in an array. Each of the nozzle cavities 86 is disposed radially between and may be formed by the nozzle inner skin 76 and the nozzle outer skin 78. Each of the nozzle cavities 86 of FIG. 2, for example, extends radially within the exhaust nozzle 50 between and to the nozzle inner skin 76 and the nozzle outer skin 78. Each of the nozzle cavities 86 is disposed circumferentially between and may be formed by a respective circumferentially neighboring (e.g., adjacent) pair of the nozzle baffles 84. Each of the nozzle cavities 86 of FIG. 2, for example, extends circumferentially within the exhaust nozzle 50 between and to the respective circumferentially neighboring nozzle baffles 84. Referring to FIG. 3, each of the nozzle cavities 86 is disposed axially between and may be formed by the forward bulkhead 80 and the aft bulkhead 82. Each of the nozzle cavities 86 of FIG. 3, for example, extends axially within the exhaust nozzle 50 between and to the forward bulkhead 80 and the aft bulkhead 82. Referring to FIG. 4, each of the nozzle cavities 86 is axially and circumferentially aligned with (e.g., overlaps) a respective set (e.g., grouping) of the inner skin perforations 90. Each of the nozzle cavities 86 may thereby be fluidly coupled with the respective set of the inner skin perforations 90.

The arrangement of nozzle elements 76, 78, 80, 82 and 84 of FIGS. 2 and 3 configure the exhaust nozzle 50 as an acoustic structure; e.g., a sound attenuating structure. The gas turbine engine 22 of FIG. 1, for example, may generate sound waves (e.g., noise) during operation. These sound waves may propagate with/through the combustion products within the core flowpath 54 towards the exhaust nozzle 50. Referring to FIG. 4, at least some of these sound waves may enter the exhaust nozzle 50 through the inner skin perforations 90. More particularly, the sound waves may enter the nozzle cavities 86 through the respective inner skin perforations 90. Within each nozzle cavity 86, the sound waves may interact with any one or more of the nozzle elements 76, 78, 80, 82 and 84; see also FIGS. 2 and 3. This interaction may reverse phase of at least some of the sound waves within the respective nozzle cavity 86 using known acoustic reflection principles. These reverse phase sound waves may subsequently be directed out of the respective nozzle cavity 86 and, more generally, the exhaust nozzle 50 through the inner skin perforations 90 to destructively interfere with other incoming sound waves. The exhaust nozzle 50 and its nozzle cavities 86 may thereby attenuate the soundwaves traveling within the core flowpath 54 before exiting the aircraft propulsion system 20 through the core exhaust 55 of FIG. 1.

Referring to FIG. 3, the nozzle mounting structure 88 is configured to support the exhaust nozzle 50 at the nozzle upstream end 68. The nozzle mounting structure 88 is also configured for mounting the exhaust nozzle 50 and its components to another stationary structure of the propulsion system housing 32; e.g., the inner case 48 of FIG. 1. The nozzle mounting structure 88 extends circumferentially about (e.g., completely around) the axial centerline 30, which may provide the nozzle mounting structure 88 with an annular or tubular body. The nozzle mounting structure 88 of FIG. 3 includes a (e.g., tubular) support ring 96 and a (e.g., annular) mounting ring 98. The support ring 96 may be abutted axially against and/or may axially overlap the nozzle inner skin 76. The support ring 96 is connected (e.g., bonded or mechanically fastened) to the nozzle inner skin 76. Alternatively, the support ring 96 may be formed integral with the nozzle inner skin 76; e.g., the support ring 96 may be an axial extension of the nozzle inner skin 76. The mounting ring 98 is disposed at (e.g., on, adjacent or proximate) the nozzle upstream end 68. This mounting ring 98 of FIG. 3 includes a flange for securing (e.g., mechanically fastening) to the other stationary structure of the propulsion system housing 32; e.g., the inner case 48 of FIG. 1.

In some embodiments, referring to FIG. 2, one or more or all of the nozzle cavities 86 may each extend circumferentially within the exhaust nozzle 50 at least thirty degrees (30°) about the axial centerline 30. Each of the nozzle cavities 86, for example, may extend circumferentially within the exhaust nozzle 50 between sixty degrees (60°) and one-hundred and twenty (120°) about the axial centerline 30; e.g., ninety degrees (90°) about the axial centerline 30. The present disclosure, however, is not limited to such exemplary arrangements. Circumferential dimensions (e.g., widths) of the nozzle cavities 86, for example, may change based on the number of nozzle cavities 86 included within the exhaust nozzle 50 about the axial centerline 30. For example, in other embodiments, one or more or all of the nozzle cavities 86 may each extend for less than sixty degrees (60°) about the axial centerline 30, or more than one-hundred and twenty (120°) about the axial centerline 30. It is further contemplated that nozzle baffles 84 may be omitted such that the exhaust nozzle 50 includes a single nozzle cavity 86.

In some embodiments, referring to FIG. 3, each of the nozzle cavities 86 has an axial cavity length 100. This axial cavity length 100 is measured axially along the axial centerline 30 between a forward end 102 of the respective nozzle cavity 86 (e.g., at the forward bulkhead 80) and an aft end 104 of the respective nozzle cavity 86 (e.g., at the aft bulkhead 82). The axial cavity length 100 may be equal to or greater than at least one-fifth (1/5) of an axial length 106 of the exhaust nozzle 50, which axial nozzle length 106 may be measured axially along the axial centerline 30 between the nozzle upstream end 68 and the nozzle trailing edge 70. The axial cavity length 100, for example, may be between one-third (1/3) and three-quarters (3/4) of the axial nozzle length 106; e.g., about one-half (1/2) or two-thirds (2/3) the axial nozzle length 106. The present disclosure, however, is not limited to such a dimensional relationship. For example, in other embodiments, the axial cavity length 100 may be less than one-fifth (1/5) of the axial nozzle length 106 or greater than three-quarters (3/4) of the axial nozzle length 106.

Figure 5:
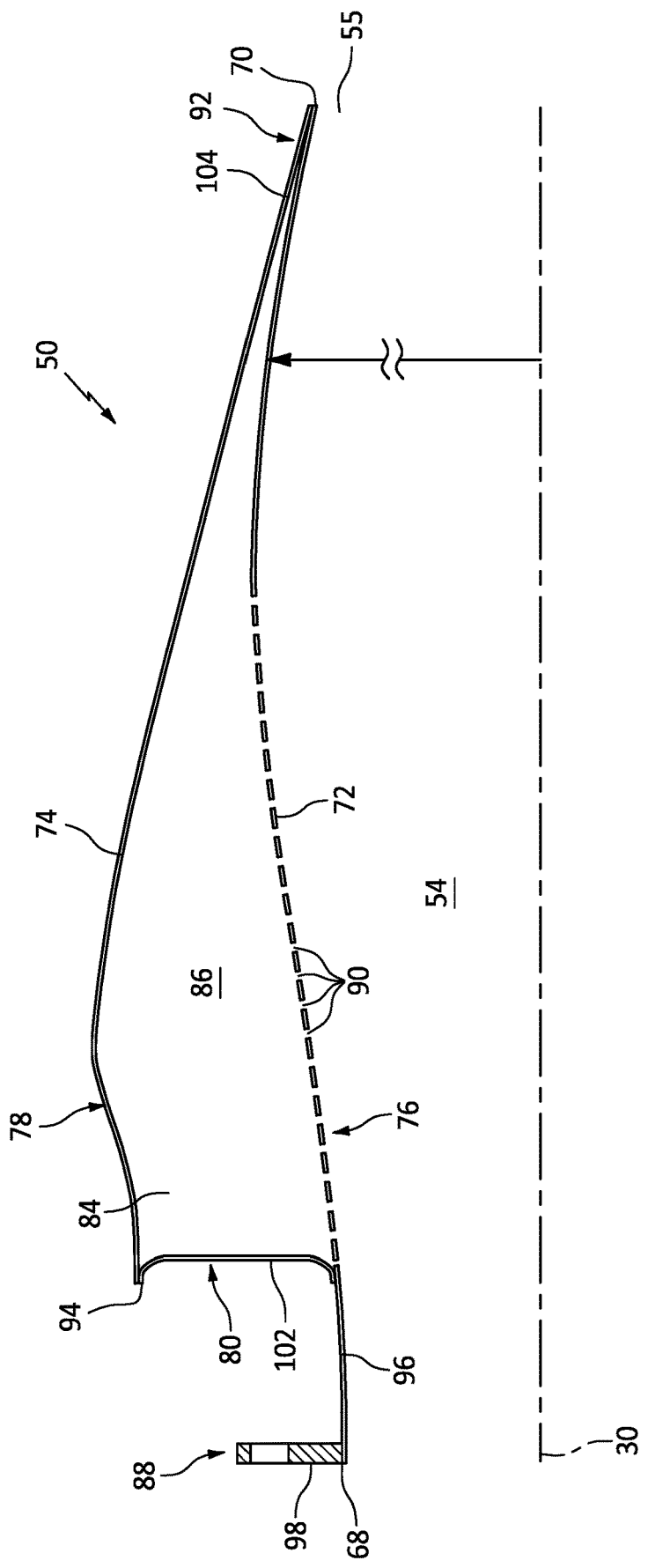
FIG. 5 is a partial side sectional illustration of the exhaust nozzle with another bulkhead arrangement.

In some embodiments, referring to FIG. 5, the exhaust nozzle 50 may be configured without the aft bulkhead 82 of FIG. 3. With such an arrangement, each of the nozzle baffles 84 may extend axially between and to the forward bulkhead 80 and the nozzle skin intersection 92. Each of the nozzle cavities 86 may similarly extend axially between and to the forward bulkhead 80 and the nozzle skin intersection 92.

The exhaust nozzle 50 may be included in various gas turbine engines other than the one described above. The exhaust nozzle 50, for example, may be included in a geared gas turbine engine where a gear train connects one or more shafts to one or more rotors in a fan section, a compressor section and/or any other engine section. Alternatively, the exhaust nozzle 50 may be included in a direct drive gas turbine engine configured without a gear train. The exhaust nozzle may be included in a gas turbine engine configured with a single spool, with two spools (e.g., see FIG. 1), or with more than two spools. The gas turbine engine 22 may be configured as a turbofan engine, a turbojet engine, a propfan engine, a pusher fan engine or any other type of gas turbine engine with an exhaust nozzle. Furthermore, the present disclosure is not limited to aircraft propulsion system applications. The gas turbine engine 22, for example, may alternatively be configured as an auxiliary power unit (APU) for the aircraft. The present disclosure therefore is not limited to any particular types or configurations of gas turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for a gas turbine engine, comprising:

an exhaust nozzle extending circumferentially about an axial centerline, the exhaust nozzle extending axially along the axial centerline to a trailing edge, the exhaust nozzle extending radially between an exterior inner surface and an exterior outer surface, the exterior inner surface configured to form an outer peripheral boundary of a core flowpath of the gas turbine engine through the exhaust nozzle, and the exterior outer surface configured to form an inner peripheral boundary for bypass air directed out of a bypass flowpath of the gas turbine engine outside of the exhaust nozzle;

the exhaust nozzle including an inner skin, an outer skin, a first bulkhead, a second bulkhead, a first cavity and a second cavity;

the inner skin forming the exterior inner surface and comprising a plurality of perforations;

the outer skin connected to the inner skin at an intersection at the trailing edge;

the first bulkhead extending radially between and connected to the inner skin and the outer skin, the first bulkhead disposed at an upstream end of the outer skin;

the second bulkhead extending radially between and connected to the inner skin and the outer skin;

the first cavity disposed radially between and formed by the inner skin and the outer skin, the first cavity extending axially within the exhaust nozzle uninterrupted from the first bulkhead to the second bulkhead, and the first cavity fluidly coupled with the plurality of perforations;

the second cavity disposed radially between and formed by the inner skin and the outer skin, and the second cavity extending axially within the exhaust nozzle uninterrupted from the second bulkhead to the intersection at the trailing edge; and the exhaust nozzle further including a plurality of baffles, each of the plurality of baffles extending radially between the inner skin and the outer skin, each of the plurality of baffles extending axially between the first bulkhead and the second bulkhead, and the plurality of baffles including a first baffle and a second baffle, and the first cavity extending circumferentially within the exhaust nozzle between the first baffle and the second baffle.

2. The assembly of claim 1, wherein the outer skin forms the exterior outer surface.

3. The assembly of claim 1, wherein the outer skin is non-perforated along the first cavity.

4. The assembly of claim 1, wherein the exhaust nozzle has an axial nozzle length; and the first cavity has an axial cavity length that is greater than or equal to one-fifth of the axial nozzle length.

5. The assembly of claim 1, wherein the exhaust nozzle has an axial nozzle length; and the first cavity has an axial cavity length that is greater than or equal to one-half of the axial nozzle length.

6. The assembly of claim 1, wherein the first cavity extends circumferentially within the exhaust nozzle at least thirty degrees about the axial centerline.

7. The assembly of claim 1, wherein the first cavity extends circumferentially within the exhaust nozzle at least sixty degrees about the axial centerline.

8. The assembly of claim 1, wherein the outer skin converges to the inner skin as the exhaust nozzle extends towards the trailing edge.

9. The assembly of claim 1, further comprising:

an exhaust center body;

the exhaust nozzle spaced radially outboard from and extending circumferentially about the exhaust center body.

10. The assembly of claim 1, further comprising:

an engine core comprising a compressor section, a combustor section and a turbine section;

the core flowpath extending sequentially through the compressor section, the combustor section and the turbine section to the exhaust nozzle.

11. The assembly of claim 1, further comprising:

a propulsion system housing including an outer housing structure, an inner housing structure and the bypass flowpath;

the inner housing structure comprising the exhaust nozzle; and the bypass flowpath formed radially between the outer housing structure and the inner housing structure.

12. The assembly of claim 1, wherein a portion of the inner skin extending axially along an entire length of the second cavity is unperforated.

\* \* \* \* \*